A. E. BROCKETT.
DRAW-KNIFE.
No. 192,895. Patented July 10, 1877.
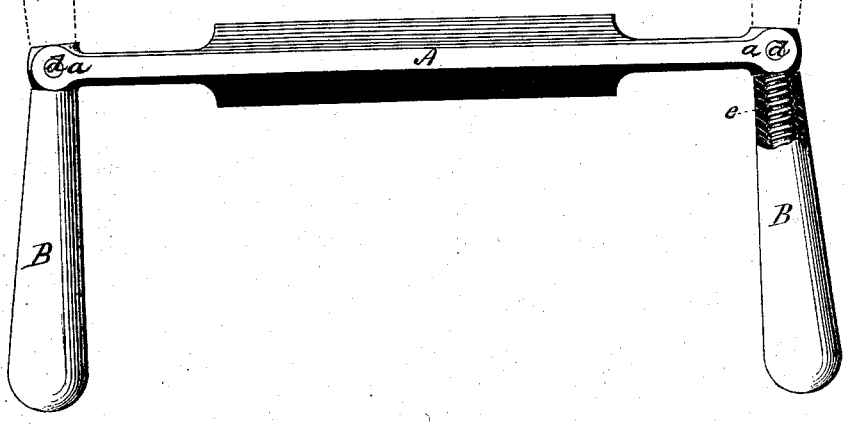
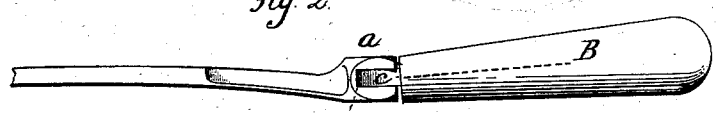

UNITED STATES PATENT OFFICE.

ATWATER E. BROCKETT, OF BRANFORD, CONNECTICUT.

IMPROVEMENT IN DRAW-KNIVES.

Specification forming part of Letters Patent No. 192,895, dated July 10, 1877; application filed April 21, 1877.

*To all whom it may concern:*

Be it known that I, ATWATER E. BROCKETT, of Branford, in the county of New Haven and State of Connecticut, have invented a new Improvement in Draw-Knives; and I do hereby declare the following, when taken in connection with the accompanying drawings and the letters of reference marked thereon, to be a full, clear, and exact description of the same, and which said drawings constitute part of this specification, and represent, in—

Figure 1, a top view, and in Figs. 2 and 3 detached views, illustrating the operation.

This invention relates to an improvement in the tool commonly called "draw-knife" or "shave," the object being to make the tool with two cutting-edges; and it consists in the peculiar manner of hinging the handle, as more fully hereinafter described.

*a a* are the two heads of the blade-bar A. These two heads are made broader at the top than at the bottom, as indicated in Fig. 3, so that the sides are each at a downwardly-inclined angle from the corresponding cutting-edge. In the end of each of the heads a horizontal slot, *b*, is formed, and into this a socket, *c*, in the end of the handle, is hung by a suitable pintle, *d*, so as to turn freely therein. This socket is constructed with a screw-shank, *e*, the axis of which is inclined downward from the plane of the socket, as indicated in Fig. 2. The handles B are bored at their inner ends, and threaded corresponding to the thread of the socket, and so as to be turned hard against either of the inclined sides of the head *a*, and the bearing between the end of the handle and the side of the head, when thus screwed on, is sufficient to hold the handle in its position; but when it is desired to turn the handle, so as to use the other edge of the knife, the handle is unscrewed from the socket sufficiently to allow it to be turned to the opposite side, as indicated in broken lines, Figs. 1 and 3, and there again reset against that side of the head. By this downward incline of the sides of the head, and a corresponding bend in the socket-shank, the desirable incline of the handles to the plane of the blade is attained, whether set for one blade or the other.

Preferably, the sides of the head are also inclined outward, as indicated in Fig. 1, which slightly spreads the handle; but this is not essential, as in that direction the handles may stand at right angles to the blade.

I do not, broadly, claim a double-edged draw-knife with reversible handles, as such, I am aware, is not new; but What I do claim as my invention, and desire to secure by Letters Patent, is—

In a draw-knife, the heads constructed with a downward incline, combined with the bent socket hinged therein, and the handle adjustable on the said socket, substantially as described.

ATWATER E. BROCKETT.

Witnesses:
JOHN E. EARLE,
CLARA BROUGHTON.